(12) United States Patent
Avellan et al.

(10) Patent No.: US 8,954,600 B2
(45) Date of Patent: Feb. 10, 2015

(54) SYSTEM AND METHOD FOR ZERO LATENCY BROWSING

(75) Inventors: Abel Avellan, Miami, FL (US); Payam Herischi, Miami, FL (US)

(73) Assignee: EMC SatCom Technologies, Inc., Miami, FL (US)

( * ) Notice: Subject to any disclaimer, the term of this patent is extended or adjusted under 35 U.S.C. 154(b) by 0 days.

(21) Appl. No.: 13/410,599

(22) Filed: Mar. 2, 2012

(65) Prior Publication Data
US 2012/0185785 A1  Jul. 19, 2012

Related U.S. Application Data

(63) Continuation of application No. 13/109,581, filed on May 17, 2011, now abandoned.

(60) Provisional application No. 61/434,089, filed on Jan. 19, 2011.

(51) Int. Cl.
| | | |
|---|---|---|
| *G06F 15/16* | (2006.01) | |
| *H04N 21/4782* | (2011.01) | |
| *H04N 21/222* | (2011.01) | |
| *H04N 21/235* | (2011.01) | |
| *H04N 21/44* | (2011.01) | |
| *H04N 21/61* | (2011.01) | |
| *H04N 21/643* | (2011.01) | |
| *H04N 21/81* | (2011.01) | |

(52) U.S. Cl.
CPC ......... *H04N 21/4782* (2013.01); *H04N 21/222* (2013.01); *H04N 21/2355* (2013.01); *H04N 21/44004* (2013.01); *H04N 21/6143* (2013.01); *H04N 21/6193* (2013.01); *H04N 21/643* (2013.01); *H04N 21/8126* (2013.01)
USPC .......................................... 709/231; 725/110

(58) Field of Classification Search
USPC .......................................... 709/231; 725/110
See application file for complete search history.

(56) References Cited

U.S. PATENT DOCUMENTS

| | | | | |
|---|---|---|---|---|
| 5,801,679 | A | * | 9/1998 | McCain ........................ 715/856 |
| 5,812,545 | A | * | 9/1998 | Liebowitz et al. ............ 370/337 |
| 6,697,850 | B1 |   | 2/2004 | Saunders |
| 7,130,908 | B1 |   | 10/2006 | Pecus et al. |

(Continued)

OTHER PUBLICATIONS

Armon, A., et al., "Cache Satellite Distribution Systems: Modeling and Analysis"; School of Computer Science, Tel Aviv University, Tel Aviv, Israel; 2003 IEEE (11 pages).

*Primary Examiner* — Thomas Dailey
(74) *Attorney, Agent, or Firm* — Blank Rome LLP

(57) ABSTRACT

A system replicates Internet websites on a large number of user computers having browsers. The system includes a gateway platform having a gateway server and a cache. In the broadcast mode, the gateway server periodically or continuously images broadcast data (e.g., popular websites), compresses the website images, and stores the compressed website images in the gateway cache. The gateway server then broadcasts all of the compressed broadcast data to all (millions) of the user computers over a broadcast device (such as a satellite), for subsequent display by the user in the browser. In the unicast mode, the user requests unicast data (e.g., less-popular websites or websites having highly user-customized information) at the browser. The gateway server images that one web page, compresses the unicast data, and transmits the compressed unicast data over the broadcast device substantially in real time to the one requesting user computer.

31 Claims, 2 Drawing Sheets

(56) References Cited

U.S. PATENT DOCUMENTS

| | | | |
|---|---|---|---|
| 7,836,470 B2* | 11/2010 | Ortega Rodriguez et al. | 725/63 |
| 2001/0018703 A1* | 8/2001 | Miyazawa et al. | 709/203 |
| 2002/0031120 A1* | 3/2002 | Rakib | 370/386 |
| 2003/0074672 A1* | 4/2003 | Daniels | 725/110 |
| 2003/0128234 A1* | 7/2003 | Brown et al. | 345/744 |
| 2010/0228875 A1* | 9/2010 | Myers | 709/231 |

* cited by examiner

SYSTEM AND METHOD FOR ZERO LATENCY BROWSING

RELATED APPLICATIONS

This application is a Continuation of U.S. patent application Ser. No. 13/109,581, filed May 17, 2011, which claims priority to U.S. Provisional Patent Application Ser. No. 61/434,089, filed Jan. 19, 2011, the entire contents of which are incorporated herein by reference.

BACKGROUND OF THE INVENTION

As noted on Wikipedia, the Internet or Internet cloud is a global system of interconnected computer networks that use the standard Internet Protocol Suite (TCP/IP) to serve billions of users worldwide. It is a network of networks that consists of millions of private, public, academic, business, and government networks, of local to global scope, that are linked by a broad array of electronic, wireless and optical networking technologies. The Internet is composed primarily of HTML documents transmitted from web servers to web browsers using the Hypertext Transfer Protocol (HTTP). However, HTTP is used to serve images, sound, and other content, in addition to HTML. To allow the Web browser to know how to handle each document it receives, other information is transmitted along with the document. This meta data usually includes the MIME type (e.g. text/html or application/xhtml+xml) and the character encoding.

The purpose of a web browser is to read HTML documents and compose them into visual or audible web pages. The browser does not display the HTML tags, but uses the tags to interpret the content of the page. The HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts in languages such as JavaScript which affect the behavior of HTML web pages.

The primary function of a web server is to deliver web pages on request to clients. This means delivery of HTML documents and any additional content that may be included by a document, such as images, style sheets and JavaScripts. A client, commonly a web browser or web crawler, initiates communication by making a request for a specific resource using HTTP and the server responds with the content of that resource or an error message if unable to do so. The resource is typically a real file on the server's secondary memory, but this is not necessarily the case and depends on how the web server is implemented.

Internet traffic consumes a significant percentage of the existing communication channels around the world. In many cases, copies of the same Internet content are being sent thousands of times in a single second. Each of these transmissions across the Internet uses a communication channel and fills the channel with unnecessary and redundant data.

One of the most common ways to access the Internet is via a terrestrial, high-capacity connection. However, terrestrial connections are limited in geographical coverage and performance. Terrestrial connections are also inconsistent in quality, even in some of the most developed countries like the United States and Japan. In emerging markets, Internet access is even more difficult. Often, local Internet exchanges are not available, and web pages or corporate data centers are hosted in different continents. As a result, WAN use severely limits Internet performance. By contrast, satellite connectivity is unlimited in geographical coverage.

SUMMARY OF THE INVENTION

Accordingly, it is an object of the invention to provide information from a network to user computers in a near-zero latency environment. It is a further object of the invention to broadcast information from a web server over a broadcast device to a multitude of user computers without loss of functionality. It is yet another object of the invention to provide Internet broadcasting channels for broadcasting information in real time. It is still another object of the invention to provide dedicated channels in a broadcast system, for sending specific information to a single user computer.

The present invention is directed to a system and method for providing high definition (HD) Internet in a near-zero latency environment. The current invention addresses latency and bandwidth efficiency by managing Internet access more efficiently and with user performance that allows viewing and interaction with web pages significantly faster than legacy systems available today over terrestrial, wireless, fiber and satellite links.

In accordance with these and other objectives, a system is provided for replicating Internet websites on a large number of user computers having browsers. The system includes a gateway platform having a gateway server and a cache. In a broadcast mode, the gateway server periodically or continuously images broadcast data (e.g., popular websites) from a public (i.e., Internet) or private network, compresses the website images, and stores the compressed website images in the gateway cache. The gateway server then broadcasts all of the compressed broadcast data to all (millions) of the user computers over a broadcast device (such as a satellite or repeater). The broadcast data is sent over one of a plurality of Broadcast Communication Channels using a transmission protocol which is substantially uniform and low bandwidth. The user computers locally store the website images in a storage device. When the user subsequently points the user computer browser to a website, the user computer checks the local storage and immediately retrieves and displays the previously-broadcast information to the user in the browser.

In a unicast mode, the user has requested unicast data (e.g., less-popular websites or websites having highly user-customized information) at the browser, which is not broadcast data and therefore has not been previously broadcast to the user computer or stored in the local storage. Instead, the browser requests the single desired web page from the gateway server. The gateway server images that web page from the network, compresses the unicast data, and transmits the compressed unicast data over the broadcast device. The unicast data is sent using a high speed, high bandwidth transmission protocol so that it is received by the requesting user computer substantially in real time, such as Differential Burst Video Transmission. The unicast data is transmitted via the broadcast device over one of a plurality of Differential Burst Video Communication Channels.

The website images capture the graphical features of the websites. To retain the functionality of the website in both the broadcast and unicast modes, the gateway computer creates a tag file which maps (e.g., using x and y coordinates) the location of various action points (e.g., selectable links, text boxes, etc.) of the web page and identifies the type of action point at each location. The tag file is sent to the user computer over one of a plurality of Tag Communication Channels and is synchronized with the image file at the user computer. Accordingly, as the image file is displayed to the user at the user computer, the actions taken by the user can be transmitted to the gateway server over a return channel on the broadcast device. The gateway server can then reproduce the user's actions on the website at the network. Thus, the system is able to provide the complete functionality and display of a website at the user computer.

DESCRIPTION OF THE EMBODIMENTS

The non-limiting embodiments of the present invention will be described hereinafter with reference to the accompanying drawings, wherein like numerals represent like elements.

Figure 1:
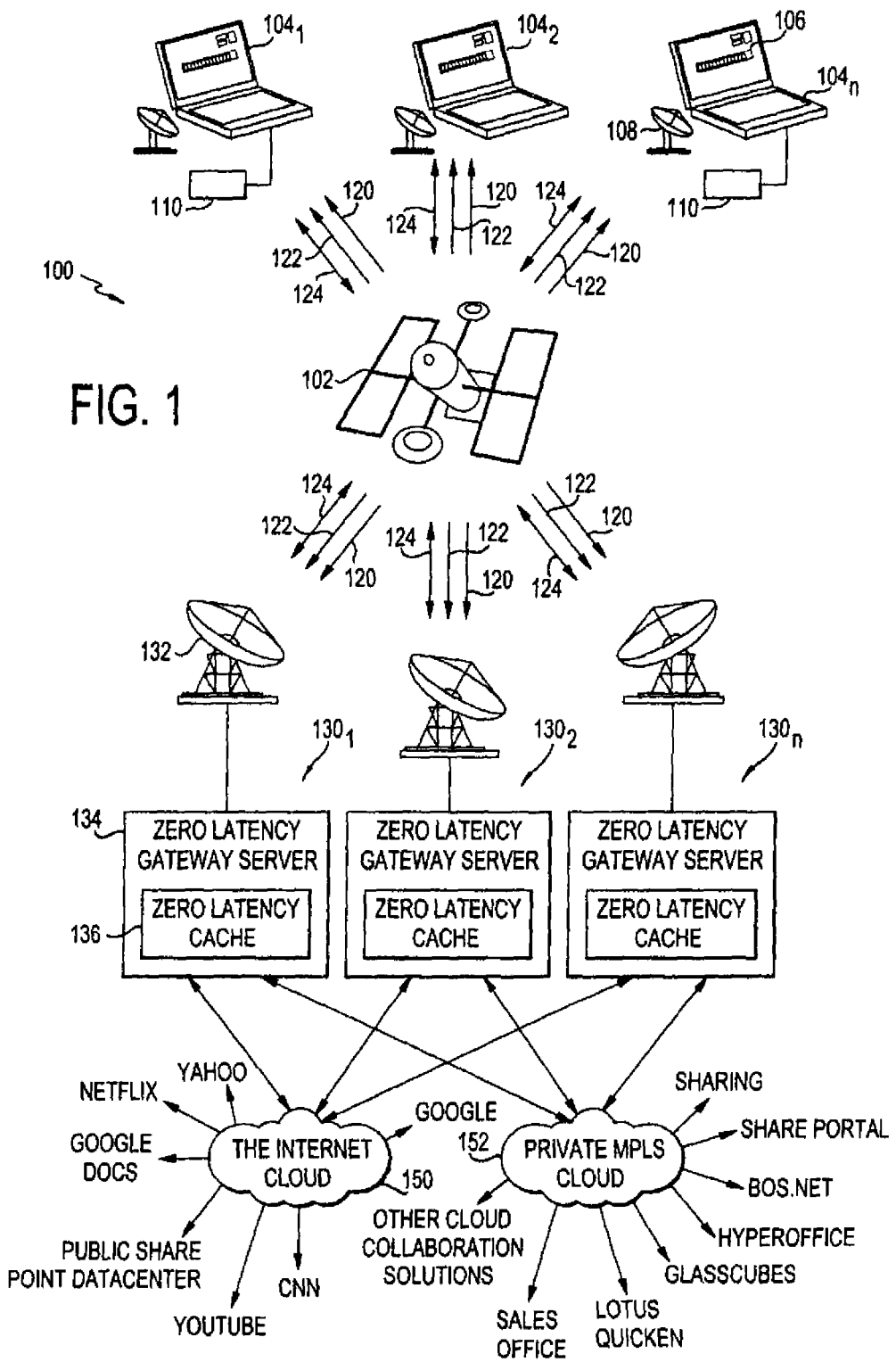
FIG. 1 provides a non-limiting example of a non-limiting embodiment of the system for HD Internet according to the present invention.

As shown in FIG. 1, the system 100 generally includes a broadcast device 102, user computers $104_1$-$104_n$, gateway platforms $130_1$-$130_n$, and networks 150, 152. The system 100 communicates data, such as websites, from the networks 150, 152 to the user computers 104, via the gateway platforms 130 and the broadcast device 102. The user utilizes a virtual browser 106 at a display of one of the user computers $104_1$-$104_n$ to access the remote networks 150, 152 through the broadcast device 102 and the remotely-located gateway platform $130_1$-$130_n$. The virtual browser 106 controls the gateway server 134 and is a remote client of the remotely-located gateway server 134. Thus, the user computers $104_1$-$104_n$ can be a dumb terminal which runs the browser 106. The user computers $104_1$-$104_n$ can also have a wireless connection 108, and a storage device 110, which can be the computer's hard drive, ROM, RAM or other memory. The storage device 110 can be integral with the user computer 104, or a separate component which is in communication with the computer 104, as shown in FIG. 1.

The connection 108 enables the browser 106 of the user computers $104_1$-$104_n$ to communicate with the gateway platform $130_1$-$130_n$ via the broadcast device 102. The connection 108 can be located at the same site as the user computer 104 and directly wired or wirelessly connected to the user computer 104. Or, the connection 108 can be located remote from the user computer 104 and communicate with the computer 104 wirelessly or wired. Thus, the connection 108 can be an air card, GSM connection, Wi Fi, Wi Max, satellite antenna, or any other wired or wireless medium which facilitates broadcasting of information from the gateway 130 to multiple user computers 104.

The user computers $104_1$-$104_n$ can be any suitable device, though preferably one having a processor, such as a laptop computer, desktop computer, smartphone, tablet PC, laptop, and Internet equipped television. The user computers $104_1$-$104_n$ can also have other hardware or software to implement the invention, such as a monitor or display and a memory or storage device 110. And, the user computers $104_1$-$104_n$ preferably have user input devices for entering information and/or operating the user computers $104_1$-$104_n$ and the browser 106, including a mouse, select button, keyboard, and/or a touchscreen, touchpad, or other suitable input device.

Each of the gateway platforms $130_1$-$130_n$ includes a respective satellite antenna 132 or a broadcast transmitter/receiver, and a gateway server 134 has a cache 136. Each gateway platform $130_1$-$130_n$ can communicate information to any one or more of the user computers $104_1$-$104_n$ via a forward channel on one of the unidirectional links 120, 122 or the bi-directional link 124 between the gateway platform $130_1$-$130_n$ and the satellite 102; and then continuing over a forward channel on one of the unidirectional links 120, 122 or the bi-directional link 124 between the satellite 102 and the user computers $104_1$-$104_n$. And, each computer $104_1$-$104_n$ can communicate information to any one or more of the gateway platforms $130_1$-$130_n$ through a return channel on the bi-directional link 124 between the user computers $104_1$-$104_n$ and the satellite 102, and then continuing over the bi-directional link 124 between the satellite 102 and the gateway platform $130_1$-$130_n$.

The gateway server 134 may be configured to communicate with the public computers, servers, networks or clouds such as the Internet cloud 150, and/or one or more private computers, servers, networks or clouds 152 such as a private MPLS (MultiProtocol Label Switching) cloud. Generally, the system 100 provides for the user computers $104_1$-$104_n$ to access the Internet 150 and/or private network cloud 152 through a virtual browser 106 of the gateway 130. The user operates the browser 106 which sends a signal over the satellite 102 to the gateway 130. The gateway 130 accesses the networks 150, 152 and returns the results to the virtual browser 106 via the satellite 102.

The gateway server 134 can be a server farm that is adapted to act as a secure and fast gateway to the Internet 150, 152, and may be a network of servers, mainframe computer(s) or other high speed and high capacity processing devices. Its speed is enhanced because it may be positioned at a strategic Internet Exchange Point (IXP), which is where Internet service providers exchange Internet traffic between their networks. For instance, the satellite antennas 132 can serve as a teleport having various ports which connect to the networks 150, 152 at multiple 1 gigabyte per second.

As shown in FIG. 1, the broadcast device 102 can be a satellite 102 which communicates with a satellite antenna 132 at the gateway end, and also communicates with a repeater or the like (not shown) at the user end. The repeater in turn communicates with a plurality of user computers 104 over a wired or wireless connection 108. However, the broadcast device 102 can be any suitable broadcast medium, such as a repeater, and a satellite need not be used. And, the satellite antenna 132 and wireless connection 108 can be any suitable devices which communicate with the broadcast device 102, so that the gateway platform 130 can broadcast information over the antennas 132 and the broadcast device 102 to a large number of user computers 104 via the wired or wireless connection 108. For instance, the user computer 104 can be in communication with the gateway platform 130 through a repeater, which in turn communicates with a plurality of user computers 104, and a satellite 102 need not be used. Though a wireless connection 108 is shown, any suitable connection can be utilized, such as a hard wire or wireless connection to a remote centralized satellite antenna.

As mentioned above, the browser software 106 resides at the gateway 134, and is configured to run as a virtual browser as a remote client of the gateway server 134. Because the browser 106 functions as a virtual browser, viruses that attack operating systems and threaten users' security are unable to infest the user's individual computing devices. In addition, the remote browser 106 may rely upon the computing power and very high-speed connection of the gateway server 134 to resolve and render pages, images, and documents from the networks 150, 152. The gateway server 134 then images those web pages (which are typically in an HTTP format) to a video or image frame format. This is preferably done by taking an image of the entire web page from top to bottom, including any portion that would normally be accessed by scrolling up/down or left/right but not immediately displayed on the screen because it is too long for a single screen.

In addition, web pages often have information which is rendered over a period of time, such as a video, streaming information, or an animated display. Accordingly, the gateway server 134 continuously captures images of the web page until it detects a repeating pattern of information in the web page. Thus, the gateway server 134 will be certain to capture all the information on the web page even if that information continues over a period of time. Once the page is imaged (including any audio on the web page), the gateway server 134 compresses the image or video frame format and sends it to the browser 106 via the satellite 102.

In a non-limiting aspect of the invention, a web-to-HD video protocol may be used to capture and transmit images/audio of a web page, including a full multimedia web page, regardless of its size or original format (e.g., HTTP). The protocol may be configured to compress the data into a compressed digital video format that can be sent to the user computer 104 for display in the browser 106. Since HTTP is inefficient and slow, the web to HD video capture protocol improves the performance of satellite channels to be equal or better than 50 msec terrestrial high-capacity channels not accessed via HD Internet using the present invention. Though the web pages are preferably imaged, any suitable technique can be used to place the web pages in a format suitable for broadcasting to a large number of user computers 104, such as converting the HTTP code to an image frame format or the like. Preferably, however, the technique is independent of the HTTP content, as in imaging.

It is noted that many web sites include selectable fields or other items which may require user interaction. By way of a non-limiting example, a website may have selectable buttons, scroll bar, browsing bar, drop-down menu, hover links, menus, selectable links, or data entry points. For ease of description, these features are collectively referred to in this application as tag data or action points. When the website is captured in a video frame format, those action points are imaged, but their functionality is not retained in the video images. Rather, a separate tag file is created which maps the various locations of the action points on the web page. That tag file is associated with the compressed video file based on the domain name for the imaged page, and the video is synchronized with the tag file so that the proper action points are associated with the video images. Accordingly, when the user views the video file on the browser 106, the user retains all the functionality of the website. Thus, the video file and the tag file cooperate to emulate or reproduce the website at the browser 106, so it appears to the user that the web page is actually being displayed in the browser 106.

For instance, it is assumed that the user has accessed a search website which has a search box where the terms to be searched are entered. The website is virtually displayed on the browser 106 as a video image of the actual site. The user may then use the mouse to click the pointer in the search box. The browser 106 recognizes from the tag file that the user has positioned the pointer in the search box, and transmits that action to the Internet site on the Internet cloud 150, via the platform 130. The user may then use the keyboard to start typing a term in the search box. Again, that action is replicated and sent to the actual website at the Internet cloud 150. The Internet site at the Internet cloud 150 then responds to the user's action, and the result is captured to an image file, compressed and sent back to the user's computer 104 for display on the browser 106. Further action may include, but is not limited to, opening another page, downloading or opening a file, printing a document, refreshing a page, filling form fields, and drag and drop mouse actions. Thus, all user actions may be performed on the computer 104 and either implemented at the user computer 104 (such as saving a file to the storage device 110 and scrolling down on the page) or recognized at the website at the Internet cloud 150 or the private cloud 152 (such as opening a link, opening a drop-down menu, and hovering over a link). Typing information may be communicated when pages are refreshed, which eliminates latency perception by the user.

The gateway server 134 transmits the video data to the user computers $104_1$-$104_n$ for display on the browser 106. The browser 106 includes all of the command and function features of a standard browser, including home, back, print, favorites, and address, and can have the standard bars, including the menu, status and command bars. The browser 106 also interfaces to the computer 104 peripherals, such as the printer, hard drive, USB ports, and the like. In addition, the browser 106 of the present invention is capable of searching the local storage device 110 to see if a web page has been previously received in the broadcast mode. The browser 106 also generates and sends commands and a tag file to the gateway server 134 so that the gateway server 134 retrieves the information desired by the user. In addition, the browser 106 controls and synchronizes the tag file and echo. For instance, if the user enters a web domain in the address field of the browser 106, the typed letters will appear in the browser 106. But, the browser 106 will not transmit the domain to the gateway server 134 until the user hits the ENTER command key or clicks the mouse to enter the domain name. Likewise, if the user moves the mouse, the mouse pointer moves on the screen of the user computer 104. However, the browser 106 does not transmit that movement to the gateway server 134 unless the mouse pointer is hovered over a link (a type of action point), or if the user clicks the mouse at an action point.

The browser 106 then recognizes when the user uses any of the input devices at the computer 104. If the user requests a web page, the user computer 104 checks its local storage device 110 for the desired information. If the requested information has been previously broadcast and stored in the storage device 110, that information is immediately displayed in the browser 106. If the requested information has not been previously stored in the storage device 110, the browser 106 prepares a tag file with the location of the action and the action point. It then transmits that tag file to the gateway platform 130 where the gateway server 134 first checks the cache 136 for the requested information. If the information is stored in the cache 136, it is sent to the user computer 104. If the information is not stored in the cache 136, the server 134 replicates the action point to the website on the Internet cloud 150. The website response is then imaged, compressed and returned to the browser 106 using a differential burst video transmission via the satellite 102.

It will be apparent that the virtual browser 106 can be any software application which can display the received video frame data to look like the web page is actually being displayed in a browser. The gateway servers 134 may also be configured to handle other computational requirements of multimedia and video related services accessed by users. Accordingly, the browser 106 takes advantage of the high processing speeds and the high speed connections (e.g., 1 Gb per second and higher) of the gateway server 134 to access information from the networks 150, 152.

The system 100 preferably has two primary modes of operation, a unicast mode to communicate unicast data using differential burst video transmission, and a broadcast mode to communicate broadcast data. Both modes are implemented at the browser 106 and/or the gateway platform 130. The unicast mode is used to send highly customized information from a single website at network 150, 152 to a single user computer 104 in real time as it is requested by the user. Accordingly, the unicast mode utilizes the differential burst video transmission to provide a very fast transmission of data having a high bandwidth over a very short period of time. And, the unicast data is given transmission priority over the broadcast data. In contrast, the broadcast mode is used to send information that is accessed by a large number of users from a single website at network 150, 152 to a large number of user computers 104. The information is continuously or periodically updated and broadcast so that it is immediately available at the user computers 104 when subsequently requested by the user. So, the information need not be sent by the differential burst video transmission protocol, but instead can be sent over a more uniform lower-bandwidth transmission over a longer period of time. And, since the broadcast data is not needed by the user as immediately as the unicast data, the broadcast data can have a lower transmission priority to the unicast data.

Thus, the mode of operation which is implemented by the gateway server 136 and the user computer 104 depends on the information (such as a website or other source) the user accesses. The information will either be unicast data or broadcast data, depending on the popularity, image-intensity and how customized the information is to the user. For instance, the gateway server 134 may track the type of usage that the users make of the networks 150, 152. It can then determine which websites are most frequently accessed and/or contain the most graphics. Based on that information, the gateway server 134 can determine that the website is unicast data or broadcast data.

Unicast data includes information from the network 150, 152 which is less popular and/or is highly customized to the user. Thus, the unicast mode is used to transmit specific sites or information to a single user computer 104, and especially those sites or information which are not amenable to being broadcast to a large number of users. The unicast data is intended to include information, such as websites, which is not frequently accessed since those sites do not (by definition) take a substantial amount of the bandwidth. And, unicast data also includes information, such as websites, which are highly specific in use or are very customized to the user, such as a search site like Google or web email like gmail or yahoo mail. Those sites are not very amenable to being broadcast to multiple users since the pages are different for each user. As a result, those sites need to be sent directly to the particular user in response to the user's request. The computer 104 can save the site to the local storage device 110, though it doesn't have to.

Since the unicast mode is for customized information, the unicast data is sent in real time without delay, directly from the network cloud 150, 152 via the gateway platform 130 and the broadcast device 102 to the user computer 104, where it may be immediately displayed (once decompressed at the computer 104). Accordingly, the unicast mode provides fast processing which is achieved using a fast differential burst video transmissions instead of standard back and forward negotiations used by existing Internet browsers, like Internet Explorer, Chrome, FireFox, Opera, and the like. The burst transmission is a high-bandwidth (several Mbits/s) transmission of data over a very short period of time, especially as compared to a TCP/IP transmission which provides a lower-bandwidth transmission over a greater period of time. The shorter transmission time also reduces the time needed by the satellite 102 to retransmit the information, which can typically have a very wide bandwidth capacity.

In addition, the differential aspect of the transmission protocol provides that only the change in the video is transmitted. For instance, suppose the first frame of a video shows a person sitting in a chair. An initial burst transmission of data is transmitted showing the person sitting in the chair. If the person raises his/her leg in the second frame, then the system only needs to transmit the leg being raised and need not transmit the rest of the person's body or the chair. The raising of the leg is sent in a short burst transmission, but there is less information to send so that burst of data will require less bandwidth and time than the initial burst transmission of data.

The broadcast mode, on the other hand, is used to send the same information to a wide number of user computers 104. Thus, the broadcast data is intended to include the most frequently visited and/or graphics-intensive web pages, but less specifically-customized information. Accordingly, suitable sites for the broadcast mode are news sites like CNN, BBC, newspaper, live streaming television feeds, movies, music downloads, or ESPN. Those sites provide the same information to a wide number of users over and over again. Though users may select to view different information, that information is not specific to the user (unlike a search site). In addition, there can be a number of broadcast channels and each channel can have a specific theme, such as country music, military television, etc. The user can then tune the browser 106 to one of the broadcast channels to receive that content. Thus, the broadcast channel can be configured here to receive live content, or to update the storage device 110 of the user computer 104.

For instance, the main page of ESPN presents the same information to all viewers, which may include scores of hockey games and basketball games. If a large number of viewers choose to select a certain hockey game, that page of the website can also be sent in the broadcast mode. On the other hand, if the user desires information which is not frequently viewed (such as about high school sports on ESPN), that information will be delivered to the computer 104 in the unicast mode and optionally stored at the storage device 110 of that computer 104.

In the broadcast mode, the gateway server 134 retrieves the desired data from the networks 150, 152, captures that data (including audio) to a video (or image) frame format, compresses that video data and stores the compressed video data in the gateway 130 at the cache 136. The cache 136 is a cache server adapted to store web pages and is in communication with the gateway server 134. The cache 136 is shown in FIG. 1 as part of the server 134, but can be separate from the server 134, and can be memory or other storage device. The gateway cache 136 preferably stores the web pages in the compressed video format, but can store the data in any suitable format(s) including HTTP format.

Once the broadcast data is stored in the gateway cache 136, the gateway server 134 then transmits that data to the multiple user computers 104, which then store that data on the storage device 110. Thus, the storage device 110 can be synchronized with the gateway cache 136 so that they both store the same information. However, the local storage device 110 can also store client-specific content that is not present in the gateway cache 136 to provide faster access to client-unique requirements and flexibility and support of the gateway cache 136.

As the broadcast sites are updated, the updated sites are cached 136 and sent to the user computers 104. The gateway server 134 can track the updates in several ways. For instance, the server 134 can continuously capture the broadcast data at the networks 150, 152. Or, the gateway server 134 can continuously or periodically compare the broadcast data stored in the cache 136 with the broadcast data at the networks 150, 152 and re-capture any broadcast data which is updated. As the information is updated, the updated broadcast data is compressed, saved to cache 136, broadcast to the user computers 104, and stored in the storage device 110.

Accordingly, the broadcast mode operates proactively, before the user requests any broadcast data, so that the information is immediately available for display in the browser 106 when the user subsequently desires to access it. The data can also (or alternatively) be stored at the user's computer 104 (or from the gateway server 136) to a CD, DVD, downloadable file, ftp site, or USB memory stick, such as one having a terabyte capacity, so that the information is available at any computer 104 that the user may access.

Thus, in the broadcast mode, the gateway server 134 accesses a website at the network 150, 152, then broadcasts that data to multiple user computers 104 at one time. For instance, the server 134 can broadcast thousands of websites to millions or tens of millions of user computers 104. That broadcast then eliminates the need to transmit the same information from those websites back and forth millions of times from the clouds 150, 152 to the user computers 104. That, in turn, reduces the bandwidth needed to communicate that information, reduces traffic on the satellite 102, and significantly improves the user experience.

As noted above, communications between the computers 104 and the gateway server 134 are over various unidirectional links 120, 122 and bidirectional links 124. Specifically, the unidirectional links include a Broadcast Communication Channel (Bcc) 120 and a Differential Burst Video Communication Channel (DBVcc) 122, while the bidirectional links include a Tag Communication Channel (Tcc) 124. Though only a single Bcc, DBVcc and Tcc channels are shown, multiple channels can be provided for each.

The Broadcast Communication Channel (Bcc) 120 is a multi-cast channel which is configured to forward broadcast data to a plurality of user computers 104. It is only used in the broadcast mode of operation. Though only one channel 120 is shown, there may be multiple broadcast channels 120 provided. Accordingly, the gateway server 134 sends the broadcast data that is stored in the gateway cache 136, over the Bcc 120 to several or all of the user computers $104_1$-$104_n$. The broadcast information is sent from the gateway cache 136 at one of the gateway platforms $130_1$-$130_n$ on the forward broadcast communication channel 120 to the satellite 102. The satellite 102, in turn, retransmits that data on the forward broadcast communication channel 120 to the browsers 106 of every user computers $104_1$-$104_n$. Thus, only one of the gateway servers 134 in communication with each satellite 102 needs to store web data in its cache 136, since the satellite 102 can retransmit that data to all of the computers 104 with which it communicates. So, each satellite 102 only needs to be in communication with a single the gateway server 134 which has a cache 136, though preferably more than one server 134 stores Internet data in a cache 136 for redundancy and to better distribute communication channels for that server 134. Accordingly, the server 134 which is closes to a particular data center can access information for a given website. For instance, the first gateway platform $130_1$ may be closest to the data center for the CNN site, and the second gateway platform $130_2$ can be closest to the data center for the BBC site. So, the first platform $130_1$ will store the CNN site in its cache 136 and the second platform $130_2$ will store the BBC site in its cache 136.

Once the broadcast data is stored at the user computer 104, that information is immediately available for display on the browser 106 when the user subsequently desires to access that data. Each user computer 104 stores all of the broadcast data. The broadcast channel 120 is unidirectional since it is only used to broadcast information to a large number of potential users. By broadcasting the broadcast data to a large number of user computers 104, the system 100 avoids having to bog down the satellite 102 (as well as the gateway server 134) with repeated individual requests from a large number of user computers 104 for those frequently-viewed sites.

Instead, those individual requests are handled immediately at the user computer 104 itself and the requested data is retrieved from the user storage device 110. This improves the overall communication flow and maximizes the efficiency of the system 100 by reducing the use of the satellite 102; which also optimizes the cost-effectiveness of the system 100 by minimizing the cost which is typically associated with the use of a satellite 102. Thus, it is advantageous to broadcast as many sites as possible in the broadcast mode to as many user computers 104 as possible. The cost of storage devices 110 continues to become exponentially cheaper, so that a large amount of broadcast data (i.e., compressed imaged websites) can easily be stored at the local storage device 110 in a cost-effective manner.

The broadcast channel 120 synchronizes the information that is transmitted. Periodically or as desired, based on user profiles, the gateway 134 may push the cache 136 to the multiple users. The gateway server 134 preferably broadcasts all of the broadcast data stored in the cache 136 to all of the user computers 104, which includes all updated sites. By sending the cache 136 to the users, bandwidth is conserved and fewer images are re-transmitted. By transmitting the cached sites over the broadcast channel 120, the system 100 need not continuously transmit the same information from those sites to each requesting computer 104 individually, which in turn reduces the bandwidth and time to view a page. That also reduces the number of times the websites themselves need to be accessed through the network cloud 150, 152.

As an illustrative example, the gateway server 134 at the first gateway platform $130_1$ may be provided with a cache 136, but the second and $n^{th}$ gateway platforms $130_2$-$130_n$ need not have caches 136 and need not communicate on a broadcast communication channel 120. That first gateway platform $130_1$ can then determine that the website for the news organization CNN is a popular site. The gateway server 134 can track the CNN site on the Internet cloud 150 and store the site to the gateway cache 136 whenever the site is modified and/or at predetermined periodic intervals. The server 134 at the first gateway platform $130_1$ can then transmit the CNN site on the broadcast communication channel 120 to the satellite 102. The satellite 102 then transmits the CNN site to each of the user computers $104_1$-$104_n$ over the broadcast communication channel 120. The user computers $104_1$-$104_n$ are then able to display the CNN site whenever it is called up by the browser 106 at the user computer $104_1$-$104_n$.

To further illustrate a feature of the invention, the gateway server 134 at the first platform $130_1$ (or the second platform $130_2$), may detect that users in the state of Florida access CNN in Spanish. The system 100 can then have the first platform $130_1$ server 134 cache and broadcast the CNN site in Spanish to Florida users, which is a subgroup of all the user computers $104_1$-$104_n$. The CNN site can be stored in a local hard drive of the user computers $104_1$-$104_n$, if desired. This methodology conserves bandwidth because websites are transmitted as video images and the data is compressed and transmitted to several user computers $104_1$-$104_n$, at once rather than the same information being transmitted multiple times by legacy Internet-based systems using HTTP, HTTPS, and TCP/IP.

The system 100 also has a Differential Burst Video Communication Channel (DBVcc) 122 which is used only in the unicast mode of operation. The DBVcc 122 is also a unidirectional channel. Though only one channel 122 is shown, there may be multiple DBVcc channels 122 provided. It is used to transmit digital video images of a web page from the gateway server 134 to one of the user computers $104_1$-$104_n$ via the satellite 102. Thus, the Differential Burst Video Communication Channel 122 is similar to the Broadcast Communication Channel 120, except that the DBVcc 122 is used to send video data to a single user computer 104 in the unicast operational mode, and the Bcc 120 is used to send video data to multiple user computers 104 in the broadcast operational mode. The DBVcc 122 is preferably a priority channel of communication, and is given priority over the Bcc 120. This can be accomplished, for instance, by setting aside a certain number of channels just for the DBVcc 122, and/or by giving priority to unicast mode communications under a COS (Class Of Service) or QOS (Quality Of Service) protocol. The priority protocol can be implemented by the server 134 and/or by the browser 106.

The Tag Communication Channel (Tcc) 124 is a two-way channel which is utilized in both the unicast mode and the broadcast mode. The Tag Communication Channel 124 transmits information related to the tag data or action points of a web page like tags and local echo for typing. Though only one channel 120 is shown, there may be multiple broadcast channels 120 provided. More specifically, the Tcc 124 provides a forward channel from the gateway server 134 to the user computer 104. The tag file includes the action points associated with a web page. The tag file is sent on the forward Tcc channel 124 so that the virtual browser 106 (as a client of the gateway server 134) can identify the action points of the website being viewed by the user. The tag file and compressed video file can also include information (such as a time stamp, ID, code, or the like) which facilitates synchronization of the tag file to the video. For instance, for a given search site, the tag file can include at least the domain name for the web page and the location (x pixels down and y pixels over) of the action taken. It can also include the action type and the action taken.

The browser 106 then creates a tag file which includes the domain name for the web page, the location where the action is taken (x pixels down and y pixels over) and the action taken (such as the movement or click of the mouse, the typing of a letter or command (tab, backspace, etc.) on the keyboard, etc.). That tag file is sent to the gateway server 134 via the satellite 102 on the return Tcc channel 124. In this manner, the browser 106 communicates the user's actions to the gateway server 134. The gateway server 134 can then replicate that action on the website on the Internet cloud 150 or private cloud 152. However, certain actions, such as scrolling the web page, can be handled by the browser 106 itself since the entire web page is imaged and saved in the local storage device 110; so that the browser 106 need not be sent to the gateway server 134.

The Tcc 124 operates in conjunction with the Bcc 120 and the DBVcc 122 to provide the complete virtual appearance of the website being accessed by the user via the gateway server 134. That is, the Tcc 124 provides the functionality of the website being accessed and either the Bcc 120 or the DBVcc 122 provides the image of the website. More specifically, the Bcc 120 provides the image of the website when the browser 106 views a site (via the satellite 102 and gateway server 134) which is sent over the broadcast channel 120 in the broadcast mode. And, the DBVcc 122 provides the image of the website when the browser 106 views a site (via the satellite 102 and the gateway server 134) which is sent over the Differential Burst Video Communication Channel 122 in the unicast mode.

The system 100 can switch between the broadcast mode and the unicast mode as the user moves between different web pages or even within subpages of a single website. For instance, if the user has accessed the CNN site in broadcast mode and clicks on a CNN link to a page which is not frequently accessed or which is customized to the user, the system 100 can switch to the unicast mode. One alternative feature of the invention is to provide one or more unidirectional Multi-cast Communication Channels (Mcc), each of which carries transmissions to a predetermined a group or subset of users. For example, users may decide to join a multi-cast group, and communications unique to that group would be transmitted to those user computers $104_1$-$104_n$ over that multi-cast channel. For example, the caching engine at the gateway server 134 may push the cache 136 periodically onto the computers 104 by multi-casting it to subscribers. In the example above, the user computers $104_1$-$104_n$ located in Florida can be assigned to a common multi-cast group having a designated multi-cast channel. By storing a portion or all of the gateway cache 136 at the gateway 134, the retransmission of video images associated with pages can be eliminated, which results in greater speed. This configuration also enables the immediate start of video, which enhances the user's experience.

All of the unicast and broadcast data are communicated over the broadcast device 102. There may be periods of high volume use which challenge the transmission capabilities of the broadcast device 102. Thus, as with the DBVcc 122, the Tcc 124 can be designated as a priority channel when the communication is in the unicast mode, so that it has priority over the Bcc 120 and over other Tcc communications which are in the broadcast mode. Thus, the order of priority for the transmissions is as follows: (a) Bcc when used for live broadcasting, (b) Tcc, (c) DBVcc, and (d) Bcc when not used for live broadcasting. In addition, all of the Tcc information can have the assigned priority, or only the tag files from the user computer 104 and when used for DBVcc can have the assigned priority; and tag files associated with the broadcast data can have a lower priority. This priority protocol can be implemented by the server 134, for instance, by setting aside a certain number of channels just for the priority channels, such as Bcc for live broadcasting, unicast Tcc 124 communications, and/or by giving priority to unicast mode communications under a COS or QOS protocol. The channels can be dedicated channels, or non-dedicated channels.

The private cloud 152 can be maintained by the operator of the gateway platform 130. Although it is globally accessible, it is a private cloud. Users at remote computer 104 can access the private cloud 152 via a private link, via the gateway 130. The private link is established by a dedicated IPL (International Private Line) or MPLS (MultiProtocol Layered Switching links) established between the gateway server 134 and the private cloud 152.

One exemplary feature of the invention provides that the gateway server 134 maintains a list of the broadcast data which is to be broadcast to the user computers. This may be, for instance, a list of the web pages which is to be regularly imaged, compressed and broadcast. That list can be updated manually and/or automatically, such as by utilizing artificial intelligence at the gateway server 134 to improve the information that is determined to be broadcast data. The user computer 104 can track the percentage of success of the requested information being stored in the storage device 110.

It can send those statistics to the gateway server 134 to learn what information or web pages should be designated as broadcast data.

Another exemplary feature of the invention enables the browser 106 to apply a one-time unique login for a user. Through this feature, the user is only required to authenticate once, namely the first time the user accesses the gateway server 134. The server 134 identifies allowable computers 104 by its MAC address and provides access to authorized computers 104. The gateway server 134 can also maintain an account history to determine how many times a computer 104 connects to the gateway server 134 for billing or other purposes. The user only needs to log in one time, during which the user can download the browser 106 to the user computer 104. When the browser 106 initially connects to the gateway server 134, it sends the MAC address for the computer 104 to the gateway server 134. All subsequent communications are based on the MAC address.

Figure 2:
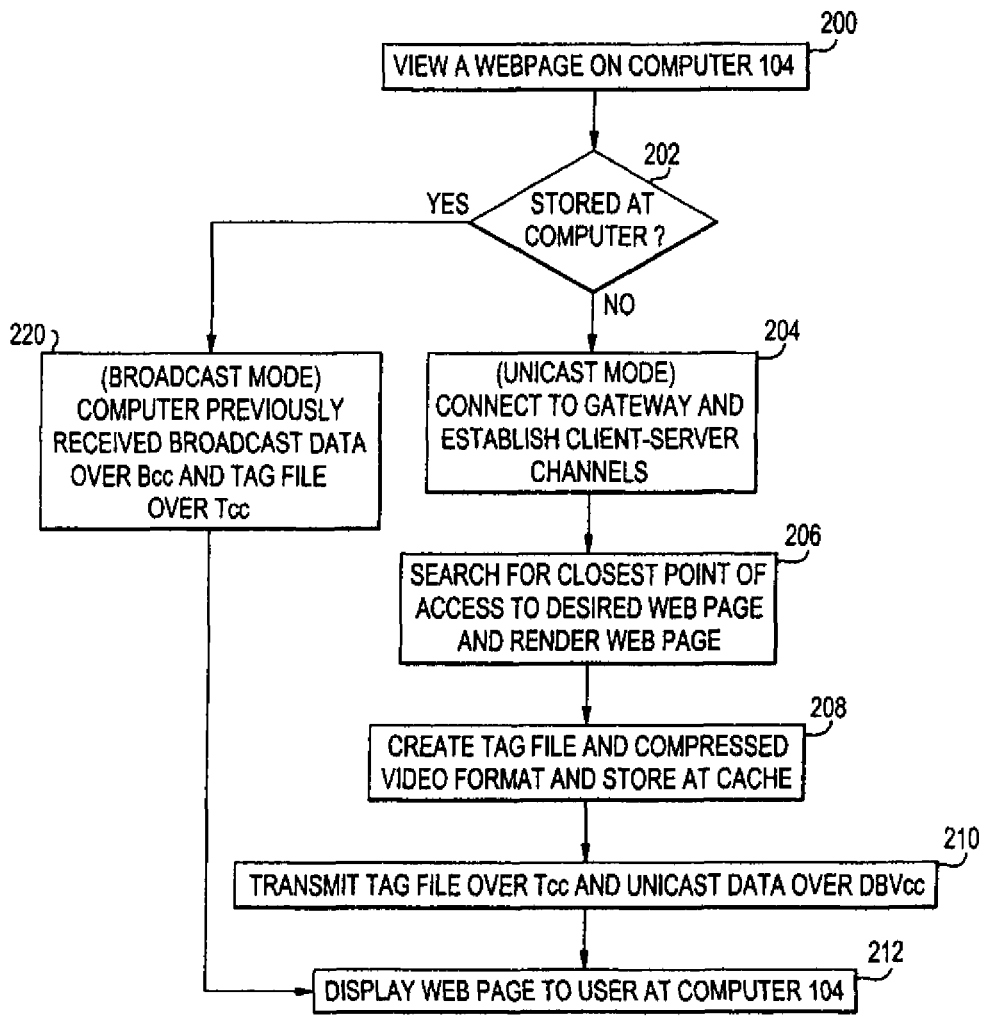
FIG. 2 illustrates a non-limiting method according to the present invention.

FIG. 2 illustrates exemplary method steps performed by the system 100 of the present invention. First, in step 200, the system recognizes that a web page option has been selected by a user at the browser 106. At step 202, the browser 106 determines if the desired web page (based on the domain name for the web page) is stored locally at the memory or storage device 110 of the computer 104. If the site is not stored at the computer 104, the browser 106 (in unicast mode) at step 204 connects to the gateway server 134 via the browser 106 and the satellite 102. At step 206, the gateway server 134 checks the cache 136 for the requested information and, if not found, searches for the closest point of access (such as a data center) to the desired web page on the cloud 150, 152. The gateway server 134 then connects to the site over the cloud 150, 152 and renders the site.

At step 208, the server 134 creates a compressed video format of the web page. The compressed video format may include all of the page's graphical information and data from different sources in a single video signal representing the image of the web page. The data may include Java, html, flash, or other programs known to those of skill in the art. Also at step 208, the server 134 creates a tag file which maps the desired website. The tag file may include positions of the scroll bar click, prompt locations, and any other action points of the web page. As mentioned above, the tag file retains the functionality of the website on the browser 106. The tag file may be periodically updated at the gateway server 134 and the computer 104 as the web page at the network 150, 152 changes, so that both views of the page are synchronized. The system can optionally store the compressed video format and the tag file in the gateway cache 136 at the gateway server 134.

At step 210, the tag file data is then transmitted to the computer 104 using the Tag Communication Channel 124, and the compressed video data is transmitted to the computer 104 using the DBVcc 122. The tag file is preferably transmitted to the user computer 104 with the compressed video data, so that the information is synchronized. At step 212, the browser 106 receives the compressed video data and the tag file from the gateway server 134 and displays the web page.

Returning to step 202, if the computer 104 determines that the requested web page is locally available in the computer memory 110, then the locally available version of the web page is used in the browser 106. The requested web page would be in the memory of the computer 104 (or the cache 136) if it is broadcast data which has been previously imaged, compressed, tagged, cached and broadcast over the Bcc 120 to the user computer 104; and the associated tag file was sent over the Tcc 124. The broadcast data can then be immediately displayed to the user in step 212, and the system 100 need not perform steps 204-210.

Although the steps in FIG. 2 have been described in sequential order for ease of understanding, it is important to note that many, if not all, of these steps may be performed in varying orders and/or in parallel. For instance, the server 134 can operate in the broadcast mode and the unicast mode at the same time. All such combinations of steps are within the scope of the present invention.

One of the benefits of the present invention is that no local process on the computer 104 is required, other than the effective display of the web page images. The gateway 130 does all the processing, so that the computer 104 can be a dumb terminal.

Accordingly, the present invention provides a gateway server 134 and a gateway cache 136 which provides public or private information from a public or private network to the browser 106 in real time. In addition, the system 100 enables a reduced, and near-zero, latency of the satellite 102. Thus, the gateway server 134, cache 136 and browser 106 provide a near-zero latency.

The gateway server 134, as well as the broadcast device 102, can be implemented by a computer having a processor to perform various functions and operations in accordance with the invention. The computer can be, for instance, a personal computer (PC), server or mainframe computer. The processor may also be provided with one or more of a wide variety of components including, for example, input device, display or monitor, and a memory or storage device such as a cache 136 or database. The system and processes implemented at the gateway platform 130, the broadcast device 102 and/or the user computer 104, can be stored on or read from computer-readable media which stores machine executable instructions for performing the processes described. Computer readable media may include, for instance, hard disks, floppy disks, DVD, memory stick, CD-ROM, dowloadable file, read-only memory (ROM) or random-access memory (RAM).

As shown and described herein, the gateway platform 130 is preferably separate from the broadcast device 102. However, all or part of the gateway platform 130, including the server 134 and the cache 136 and its associated functionality, can be integrated with and located together with the broadcast device 102. In an embodiment where the broadcast device 102 is a satellite, the satellite can have the features discussed in co-pending application Ser. No. 61/350,211, filed Jun. 1, 2010, the entire contents of which are hereby incorporated by reference.

In addition, a firewall can be provided at the gateway server 134, so that any forward communications from the gateway server 134 have to pass through the firewall before being transmitted to the satellite 102. This greatly simplifies security by reducing the number of security points and firewalls that might otherwise be needed. The system 100 also provides a secure access for public and private cloud 150, 152 services.

Other features of the invention can include time stamping the data stored in cache 136, and/or time stamping the access made by the users and storing that information in the user's account.

Finally, while the preferred embodiment of the invention has been described to communicate websites over a broadcast system, other information may be communicated. For instance, movies, database and HD movies can be broadcast to user computers 104.

Numerous modifications and variations of the present invention are possible in light of the above teachings. It is therefore to be understood that within the scope of the appended claims, the invention may be practiced otherwise than as specifically described herein.

The invention claimed is:

1. A system for communicating first and second data from a plurality of first computers to a plurality of second computers remotely located from the plurality of first computers, the system comprising:
   a processing device configured to capture the first data in a video frame format from at least one of the plurality of first computers, transmit the first data via satellite over a first satellite communication channel using a differential burst video transmission to no more than one of the plurality of second computers to display the captured data in the video frame format, to capture the second data from at least one of the plurality of first computers and to broadcast the second data via satellite over a second satellite communications channel different from the first communications channel to the plurality of second computers,
   wherein the plurality of second computers includes a first plurality of second computers and a second plurality of second computers different from he first plurality of second computers, and wherein said processing device is further configured to receive requests for data from at least a portion of the first plurality of second computers and at least a portion of the second plurality of second computers, determine most frequently requested data for the first plurality of second computers, determine most frequently-requested data for the second plurality of second computers separate from determining the most frequently requested data for the first plurality of second computers, capture the requested data from at least one of the plurality of first computers, transmit the captured requested data as first data to the first plurality of second computers if it is determined that the requested data is not the most frequently requested data for the first plurality of second computers, transmit he captured requested data as first data to the second plurality of second computers if it is determined that the requested data is not the most frequently requested data for the second plurality of second computers, transmit the captured requested data as second data to the first plurality of second computers if it is determined that the requested data is the most frequently requested data for the first plurality of second computers, and transmit the captured requested data as second data to the second plurality of second computers if it is determined that the requested data is the most frequently requested data for the second plurality of second computers.

2. The system of claim 1, wherein the data is provided by the plurality of first computers in a first format, and said processing device captures at least a portion of the data in a video frame format, and the video frame format is different from and independent of the first format.

3. The system of claim 2, wherein the first format is an HTTP format.

4. The system of claim 2, wherein said processing device captures the entirety of the data to a video frame format.

5. The system of claim 1, wherein each of the plurality of first computers is a server accessible through a global network, and the plurality of second computers are dumb terminals.

6. The system of claim 1, wherein the data is a web page and said processing device causes the plurality of second computers to display a virtual image of the web page.

7. The system of claim 1, wherein said processing device comprises a processor.

8. The system of claim 1, wherein further comprising a storage device for storing the captured data.

9. The system of claim 1, wherein said processing device comprises a processor in communication with a storage device and said processor stores the captured data in said storage device.

10. The system of claim 1, wherein the plurality of second computers are configured to receive a user input action command, and in response to the user input action command create a tag file comprising a location of the user input action command, a type of the user input action command, and the user input action command.

11. The system of claim 10, wherein the location of the user input action command comprises an x coordinate and a y coordinate.

12. The system of claim 10, wherein the type of the user action input comprises a keyboard entry or a mouse entry.

13. The system of claim 10, wherein the user input action command comprises a mouse click, a scroll, or a typed key command.

14. The system of claim 10, wherein said processing device further receives the tag file and performs the user input action command on the plurality of first computers.

15. A system for presenting first and second web pages of at least one web server on a plurality of user computers remotely located from the at least one web server, wherein the plurality of user computers includes a first plurality of user computers and a second plurality of user computers different from the first plurality of user computers, the system comprising:
   a gateway storage device; and,
   a gateway processor in communication with said gateway storage device, said gateway processor configured to access the first web page from the at least one web server in an HTTP format, create a web page image of the first web page in a graphics format, store the web page image to said gateway storage device, and transmit the web page image to the user computer via satellite over a first satellite communication channel, said gateway processor further configured to access the second web page from the at least one web server and transmit the second web page to the user computer via satellite over a second satellite communication channel different than the first satellite communication channel;
   wherein said gateway processor is further configured to receive requests for data from at least a portion of the first plurality of user computers and at least a portion of the second plurality of user computers, determine most frequently requested data for the first plurality of user computers, determine most frequently requested data for the second plurality of user computers separate from determining the most frequently requested data for the first plurality of user computers, capture the requested data from at least one of the plurality of first computers, transmit the captured requested data as first data to the first plurality of user computers if it is determined that the requested data is not the most frequently requested data for the first plurality of user computers, transmit the captured requested data as first data to the second plurality of user computers if it is determined that the requested data is not the most frequently requested data for the second plurality of user computers, transmit the captured requested data as second data to the first plurality of user computers if it is determined that the requested data is the most frequently requested data for the first plurality of user computers, and transmit the captured requested data as second data to the second plurality of user computers if it is determined that the requested data is the most frequently requested data for the second plurality of user computers.

16. The system of claim 15, said gateway processor further configured to display the web page image at the user computer.

17. The system of claim 15, further comprising a plurality of user computers, said gateway processor broadcasting the same web page image to each of the plurality of user computers.

18. A system for virtually replicating a web page of a web server on a plurality of user computers remotely located from the web server, wherein the plurality of user computers includes a first plurality of user computers and a second plurality of user computers different from the first plurality of user computers, the system comprising:
  a gateway storage device; and,
  a gateway processor in communication with said gateway storage device, said gateway processor configured to access the web page from the web server, create a web page image of the web page, create a tag file identifying an action point of the web page and a location of the action point, transmit the web page image to the user computer via satellite over a first satellite communication channel, and transmit the tag file to the user computer via satellite over a second satellite communication channel different from the first satellite communication channel;
  wherein said gateway processor is further configured to receive requests for data from at least a portion of the first plurality of user computers and at least a portion of the second plurality of user computers, determine most frequently requested data for the first plurality of user computers, determine most frequently requested data for the second plurality of user computers separate from determining the most frequently requested data for the first plurality of user computers, capture the requested data from at least one of the plurality of first computers, transmit the captured requested data as first data to the first plurality of user computers if it is determined that the requested data is not the most frequently requested data for the first plurality of user computers, transmit he captured requested data as first data to the second plurality of user computers if it is determined that the requested data is not the most frequently requested data for the second plurality of user computers, transmit the captured requested data as second data to the first plurality of user computers if it is determined that the requested data is the most frequently requested data for the first plurality of user computers, and transmit the captured requested data as second data to the second plurality of user computers if it is determined that the requested data is the most frequently requested data for the second plurality of user computers.

19. The system of claim 18, said gateway processor transmitting the tag file to the user computer to display the action point on the user computer.

20. The system of claim 19, wherein the tag file is synchronized with the web page image.

21. The system of claim 15, wherein there is a first web page and a second web page, a first tag file associated with the first web page, a second tag file associated with the second web page, and at least one web server, and said gateway processor operates in a broadcast mode to broadcast the first web page to a plurality of user computers via satellite over the first satellite communication channel and the first tag file via satellite over the second satellite communication channel, and said gateway processor operates in a unicast mode to transmit the second web page to one of the plurality of user computers via satellite over a third satellite communication channel different than the first and second satellite communication channels and the second tag file via satellite over the second satellite communication channel.

22. The system of claim 1, said processing device having a master cache and said second computers each having a local cache, said processing device configured to synchronize the master cache via the second satellite communications channel to the local cache of the second computers.

23. The system of claim 22, wherein the master cache includes most visited web pages and their sub-links.

24. The system of claim 23, wherein the local cache is client specific and includes information that is not in the master cache to provide faster access to client unique requirements and flexibility and support of the master cache.

25. The system of claim 22, further storing a replica of the master cache in a mobile storage device.

26. The system of claim 10, wherein the tag file is transmitted over a third communications channel different from the first and second satellite communications channels.

27. The system of claim 1, wherein the plurality of second computers are each configured to transmit a request for the first data to said processing device via satellite.

28. The system of claim 1, wherein said processing device is further configured to receive a request for data from the plurality of second computers, determine most frequently requested data, capture the requested data from at least one of the plurality of first computers, transmit the captured requested data as first data if it is determined that the requested data is not the most frequently requested data, and transmit the captured requested data as second data if it is determined that the requested data is the most frequently requested data.

29. The system of claim 1, wherein the differential burst video transmission comprises a first data format, and said processing device is configured to broadcast the second data in a second data format different from the first data format.

30. The system of claim 15, wherein said processing device is configured to broadcast the second data in a data format different from the graphics format.

31. A system for communicating first and second data from a plurality of first computers to a plurality of second computers remotely located from the plurality of first computers, the system comprising:
  a processing device configured to capture the first data in a video frame format from at least one of the plurality of first computers, transmit the first data via satellite over a first satellite communication channel using a differential burst video transmission to no more than one of the plurality of second computers to display the captured data in the video frame format, to capture the second data from at least one of the plurality of first computers and to broadcast the second data via satellite over a second satellite communications channel different from the first communications channel to the plurality of second computers, wherein said processing device only transmits changes in the first data.

* * * * *